(12) United States Patent
Ocain et al.

(10) Patent No.: US 10,106,326 B1
(45) Date of Patent: Oct. 23, 2018

(54) HINGED COVER FOR CONVEYOR RAIL

(71) Applicant: Hilmot, LLC, Milwaukee, WI (US)

(72) Inventors: Jason Ocain, Saint Francis, WI (US); Joe Klein, Muskego, WI (US); Tony Hill, Wauwatosa, WI (US); Zachary Kaehler, Kewaskum, WI (US)

(73) Assignee: Hilmot, LLC, Milwaukee, WI (US)

( * ) Notice: Subject to any disclaimer, the term of this patent is extended or adjusted under 35 U.S.C. 154(b) by 0 days.

(21) Appl. No.: 15/902,636

(22) Filed: Feb. 22, 2018

Related U.S. Application Data

(60) Provisional application No. 62/462,126, filed on Feb. 22, 2017.

(51) Int. Cl.
*B65G 21/00* (2006.01)

(52) U.S. Cl.
CPC ................... *B65G 21/00* (2013.01)

(58) Field of Classification Search
CPC ..................................................... B65G 21/00
USPC ............................... 198/860.1, 860.3, 861.1
See application file for complete search history.

(56) References Cited

U.S. PATENT DOCUMENTS

| | | | |
|---|---|---|---|
| 4,953,693 A | 9/1990 | Draebel | |
| 5,361,894 A * | 11/1994 | Solcz | B65G 13/11 |
| | | | 198/790 |
| 6,158,574 A | 12/2000 | Williams et al. | |
| 6,629,779 B1 | 10/2003 | Mischler et al. | |
| 6,749,338 B2 | 6/2004 | Schmidt | |
| 6,854,397 B2 * | 2/2005 | Terajima | B65G 21/06 |
| | | | 104/95 |
| 7,152,730 B2 * | 12/2006 | Gerke | B65G 21/00 |
| | | | 198/860.3 |
| 7,387,195 B2 | 6/2008 | Bonham et al. | |
| 7,800,009 B2 | 9/2010 | Gochar, Jr. | |
| 7,874,027 B2 | 1/2011 | Polevoy et al. | |
| 8,051,976 B2 * | 11/2011 | Koeda | B65G 21/06 |
| | | | 198/837 |
| 8,590,697 B2 * | 11/2013 | Lim | B65G 21/2072 |
| | | | 198/860.1 |
| 8,985,476 B1 | 3/2015 | O'Connell et al. | |
| 9,365,353 B2 * | 6/2016 | Collot | B65G 21/2072 |
| 2009/0290818 A1 | 11/2009 | Chen | |

* cited by examiner

*Primary Examiner* — Douglas A Hess
(74) *Attorney, Agent, or Firm* — Haugen Law Firm PLLC

(57) ABSTRACT

An apparatus for covering the side rails of a conveyor framework. The apparatus includes a locking tab, grip and living hinge that together allow for a greater likelihood that the cover will remain intact on the rail of a conveyor framework.

8 Claims, 14 Drawing Sheets

FG. 8

HINGED COVER FOR CONVEYOR RAIL

CROSS-REFERENCE TO RELATED APPLICATIONS

The present application claims priority to U.S. Provisional Patent application Ser. No. 62/462,126, filed on Feb. 22, 2017, the application of which is incorporated herein by reference in its entirety

FEDERAL SPONSORSHIP

Not Applicable

JOINT RESEARCH AGREEMENT

Not Applicable

TECHNICAL FIELD

The present invention relates to a framework component of a conveyor system, and more particularly to a framework cover for the open side of a c-channel rail of a conveyor framework. The cover in accordance with the present invention is further related to a c-channel cover capable of engaging with the c-channel rail and operable between an open and closed position while remaining engaged with the c-channel.

BACKGROUND

The framework of a conveyor systems typically includes a series of parallel spaced rollers mounted to side rails. The side rails are often times constructed from c-posts, channels or studs. The open side of the c-channel is typically oriented to face outward and the roller ends are mounted to the closed side of the c-channel. Controls and wires are oftentimes mounted and routed within the inner space of the c-channel. A plastic cover has been utilized to enclose the controls and wires and reduce unwanted access to the controls and wires. These plastic covers, however, have flanges that engage to the top and bottom portions of the c-channel. A slight tension in the part keeps the covers in place.

In the past, when there was a need to access the inside of the rail, the cover would be completely removed from the rail and set aside. When the cover was set aside there was an increased likelihood of being damaged, lost or simply not replaced on the rail. When the prior covers were set aside the inside components and wires of the rail were left exposed and unprotected.

SUMMARY

Embodiments according to aspects of the invention include a cover apparatus for covering or enclosing an open side of a c-channel rail used in the framework of a conveyor system. The apparatus of the invention is particularly well suited to attach to a c-channel rail and remain attached in both an open and closed position of the cover. In an embodiment of the invention, the cover includes an elongated main body having a top section, mid section and bottom section. The top section has a locking tab extending from an inner side of the top section. The mid section has a handle or grip member extending from an outer side of the mid section. The bottom section has a clip extending from a bottom of the bottom section, wherein a living hinge interconnects the clip and bottom section.

The embodiments according to aspects of the invention may additionally include a hook extending from an end of the tab, wherein the tab may further be flexible. The mid section of the elongated main body may be made to arc to create flexibility in the mid section. Further, the elongated main body adapts to enclose an open section of a hollow longitudinal c-channel conduit, wherein the c-channel conduit has an enclosed side, an enclosed top, an enclosed bottom and flanges extending from the top and bottom towards each other to form a partially open side and the clip engages the bottom flange and the locking tab engages the top flange.

Another embodiment according to aspects of the invention includes an elongated main body having a top section, mid section and bottom section. The top section has a locking tab extending from an inner side of the top section. The mid section has a handle member extending from an outer side of the mid section. The bottom section has a clip extending from a bottom of the bottom section, wherein a living hinge interconnects the clip and bottom section. Additionally, the elongated main body adapts to enclose an open section of a hollow longitudinal c-channel conduit. The c-channel conduit has an enclosed side, an enclosed top, an enclosed bottom and flanges extending from the top and bottom towards each other to form a partially open side. Further the clip engages the bottom flange and the locking tab engages the top flange.

The embodiments according to aspects of the invention may additionally include a locking tab that is flexible and includes a hook extending from an end of the tab. Also, the mid section may arc to create additional flexibility in the mid section.

A further embodiment of the invention includes an apparatus for covering a c-channel side rail of a conveyor framework. The apparatus includes an elongated main body having a top section, mid section and bottom section. The top section has a flexible locking tab extending from an inner side of the top section. The mid section has an arc to create flexibility in the mid section and the mid section further has a handle member extending from an outer side of the mid section. The bottom section has a clip extending from a bottom of the bottom section, wherein a living hinge interconnects the clip and bottom section. The elongated main body adapts to enclose an open section of a hollow longitudinal c-channel conduit, wherein the c-channel conduit has an enclosed side, an enclosed top, an enclosed bottom and flanges extending from the top and bottom towards each other to form a partially open side. The clip engages the bottom flange and the locking tab engages the top flange.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
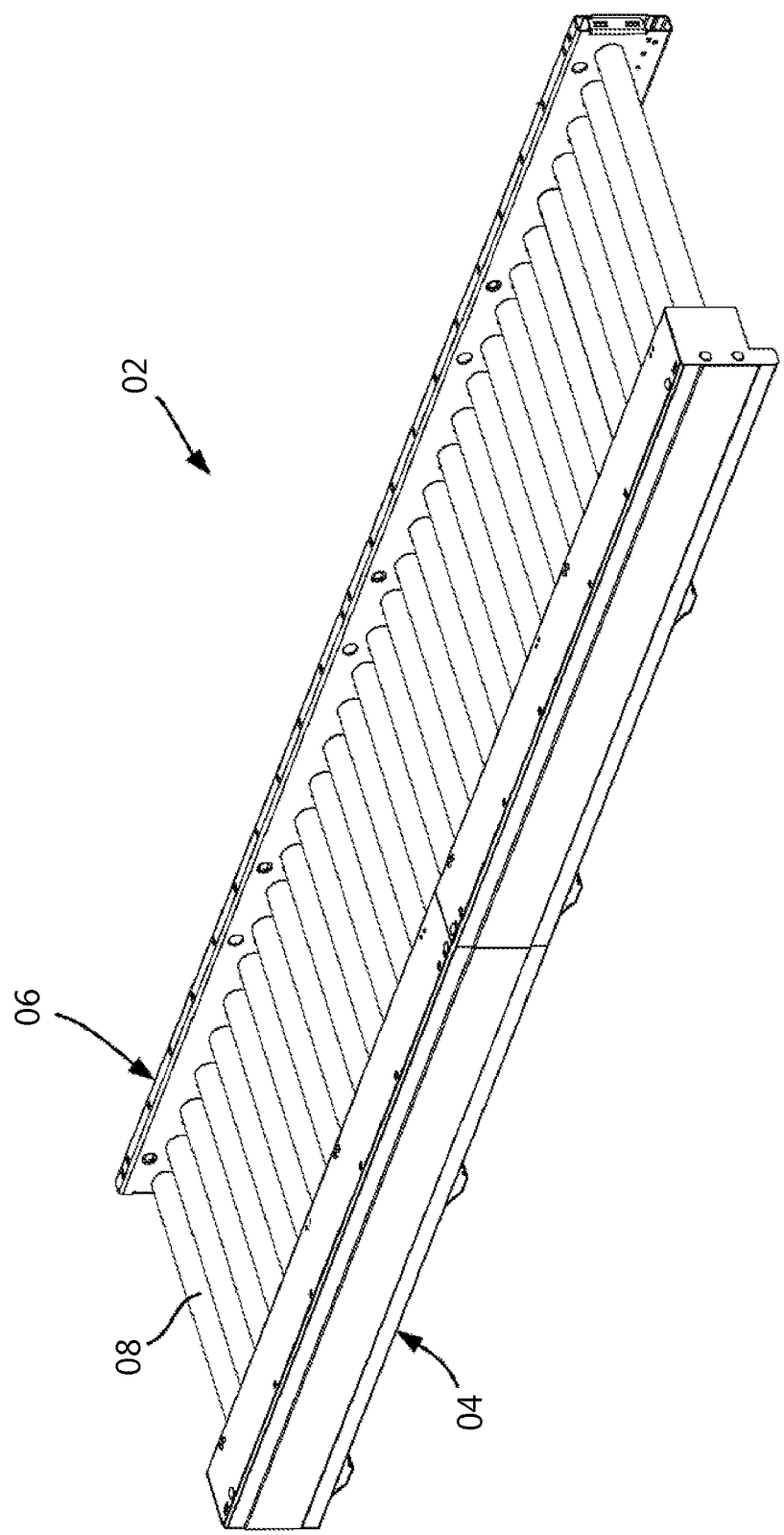
FIG. 1 is a partial perspective view of conveyor assembly.
Figure 2:
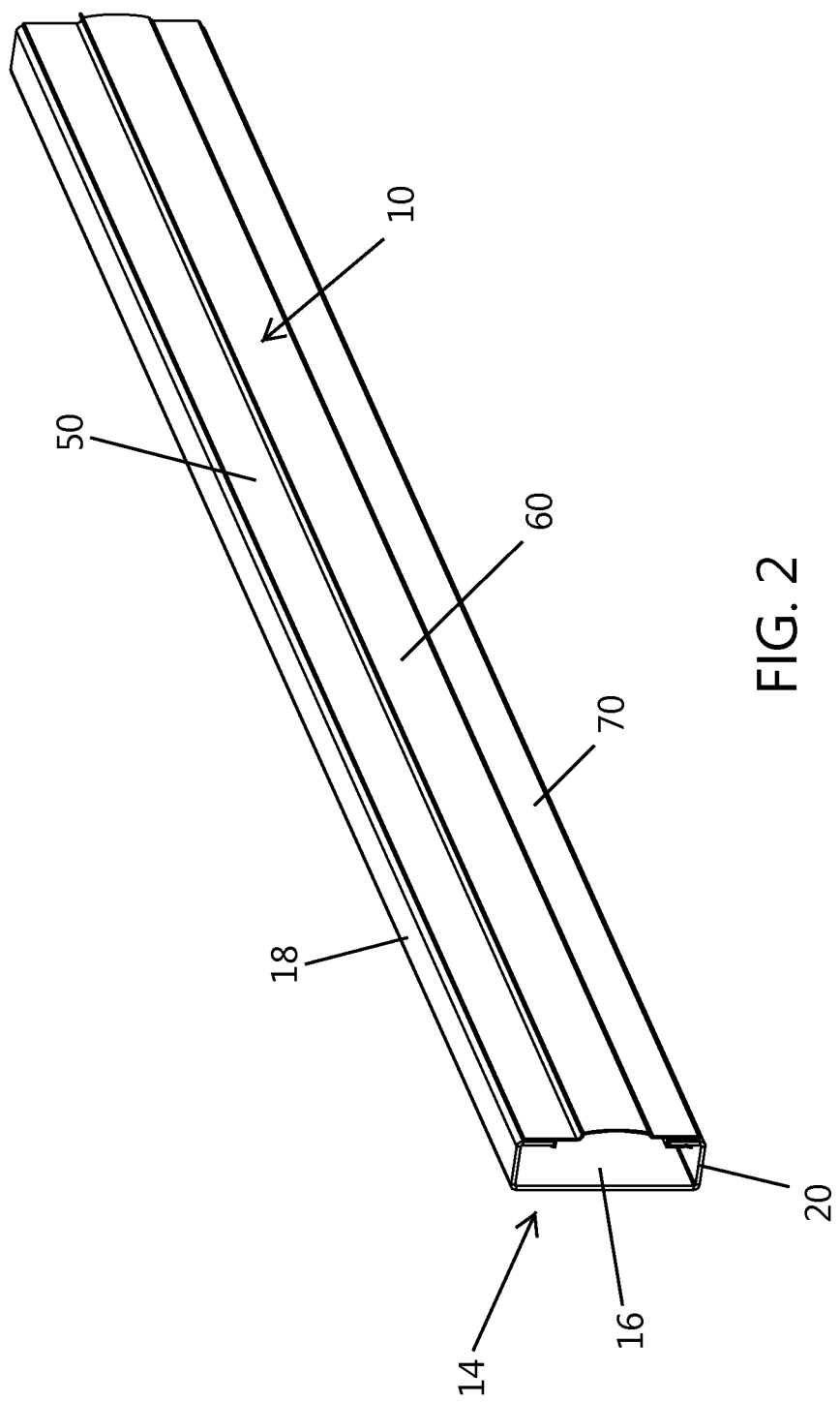
FIG. 2 is a left front perspective view of a hinged cover in accordance with an embodiment of the invention shown attached to conveyor rail in a closed position.
Figure 3:
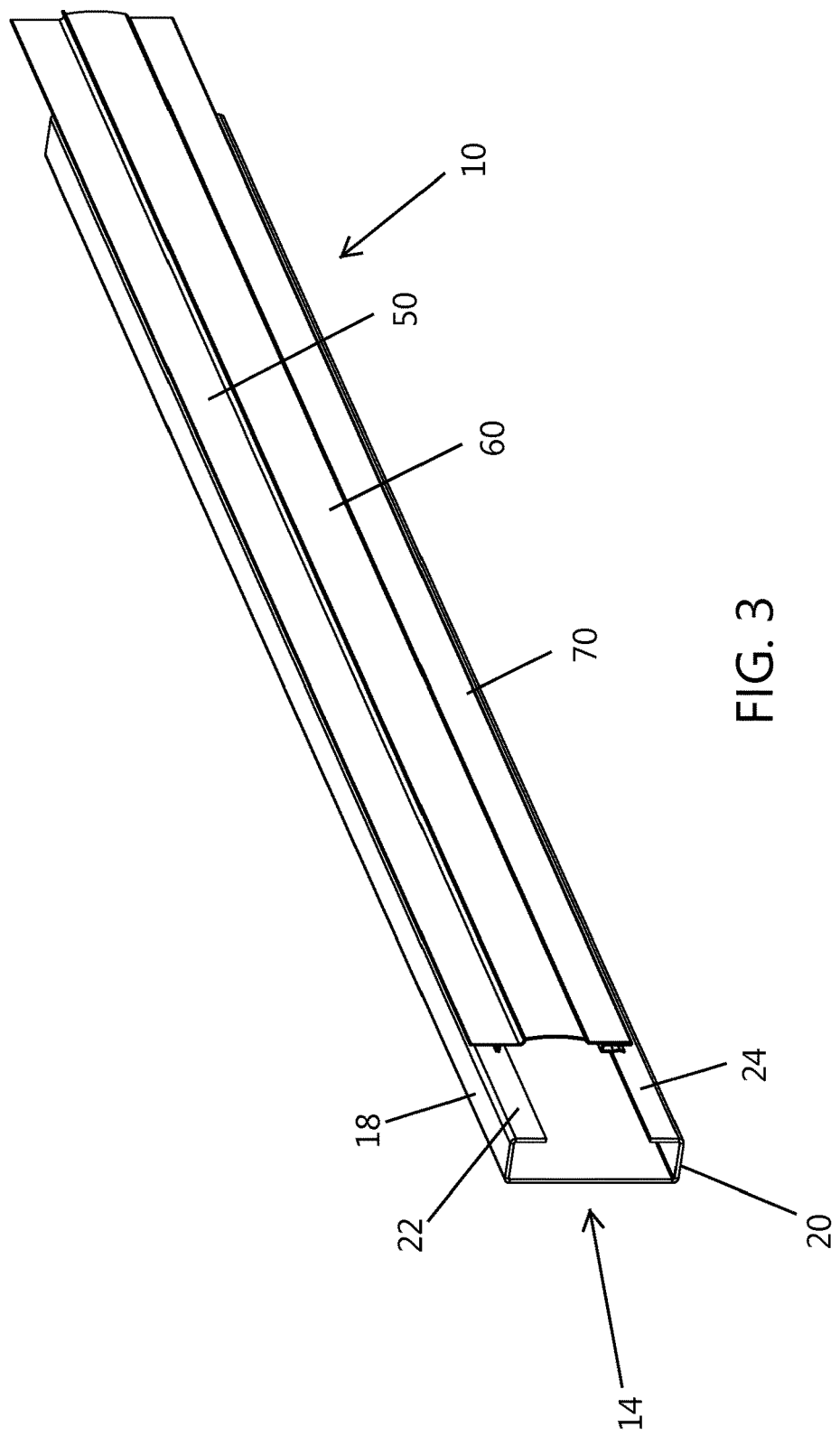
FIG. 3 is a left front perspective view of a hinged cover in accordance with an embodiment of the invention shown aligned but elevated away from a c-channel rail.
Figure 4:
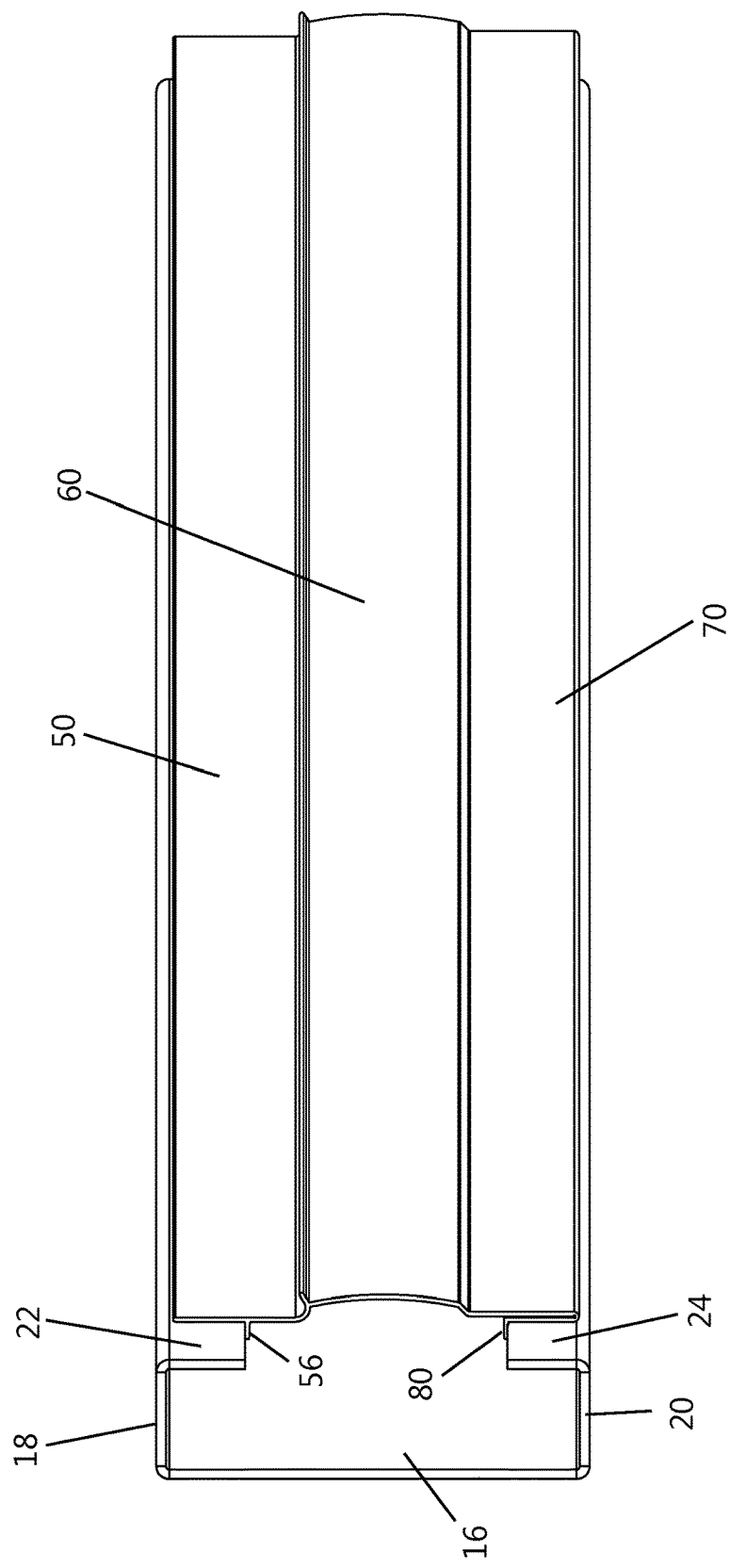
FIG. 4 is an enlarged left front perspective view of a hinged cover in accordance with an embodiment of the invention shown engaged to a portion of a c-channel rail.
Figure 5:
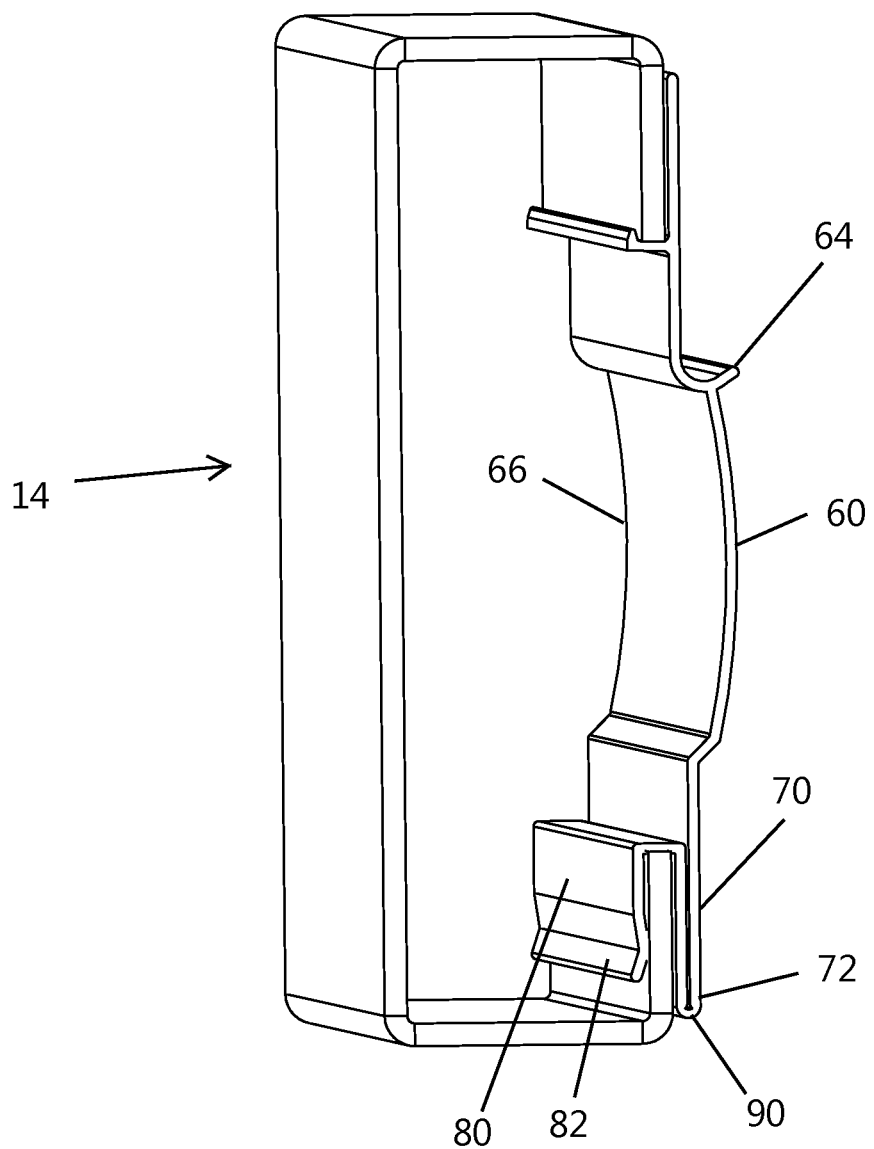
FIG. 5 is a partial sectional end perspective view of a hinged cover in accordance with an embodiment of the invention shown engaged to a portion of a c-channel rail in the closed position.
Figure 6:
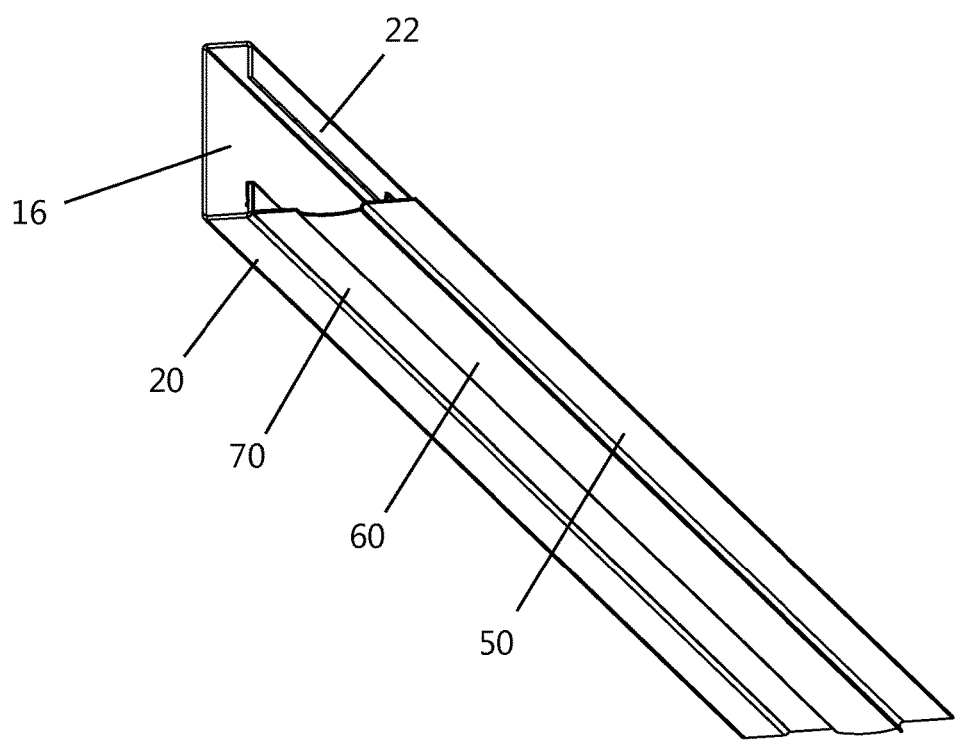
FIG. 6 is a bottom perspective view of a hinged cover in accordance with an embodiment of the invention shown engaged to a portion of a c-channel rail in the open position.
Figure 7:
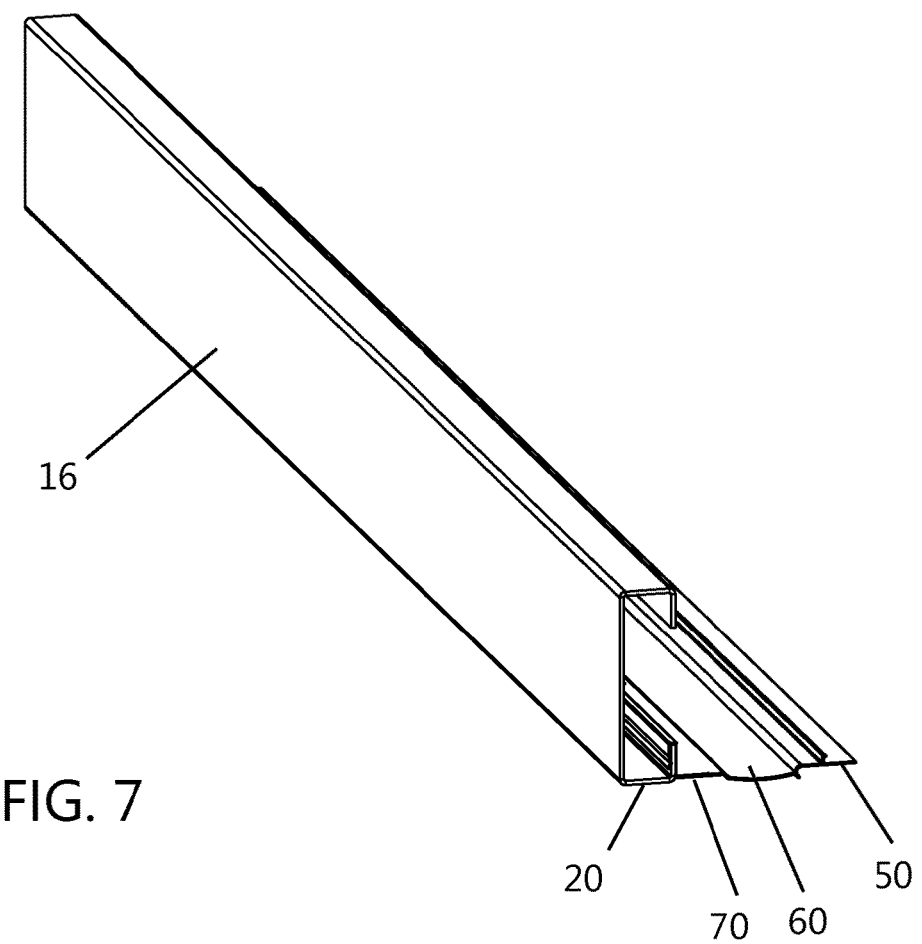
FIG. 7 is a top back perspective view of a hinged cover in accordance with an embodiment of the invention shown engaged to a portion of a c-channel rail in the open position.
Figure 8:
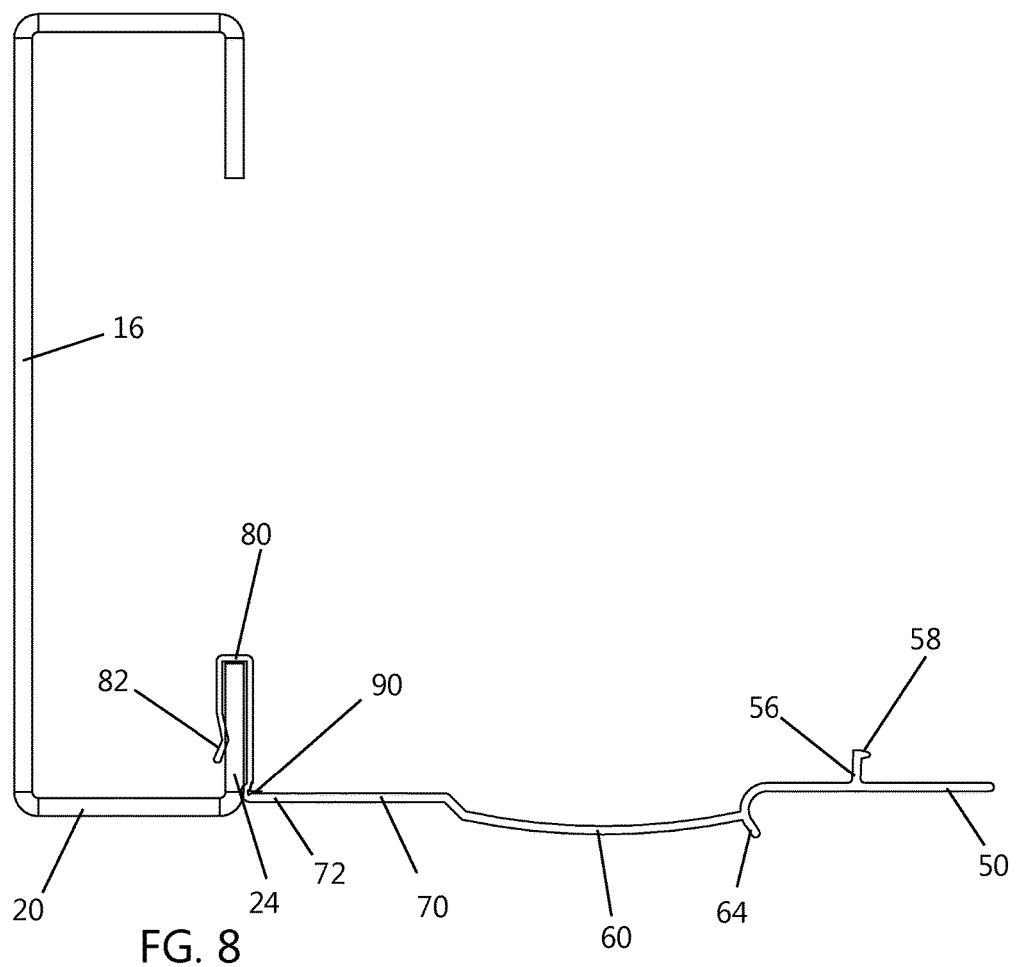
FIG. 8 is an end view of a hinged cover in accordance with an embodiment of the invention shown engaged to a portion of a c-channel rail in the open position.
Figure 9:
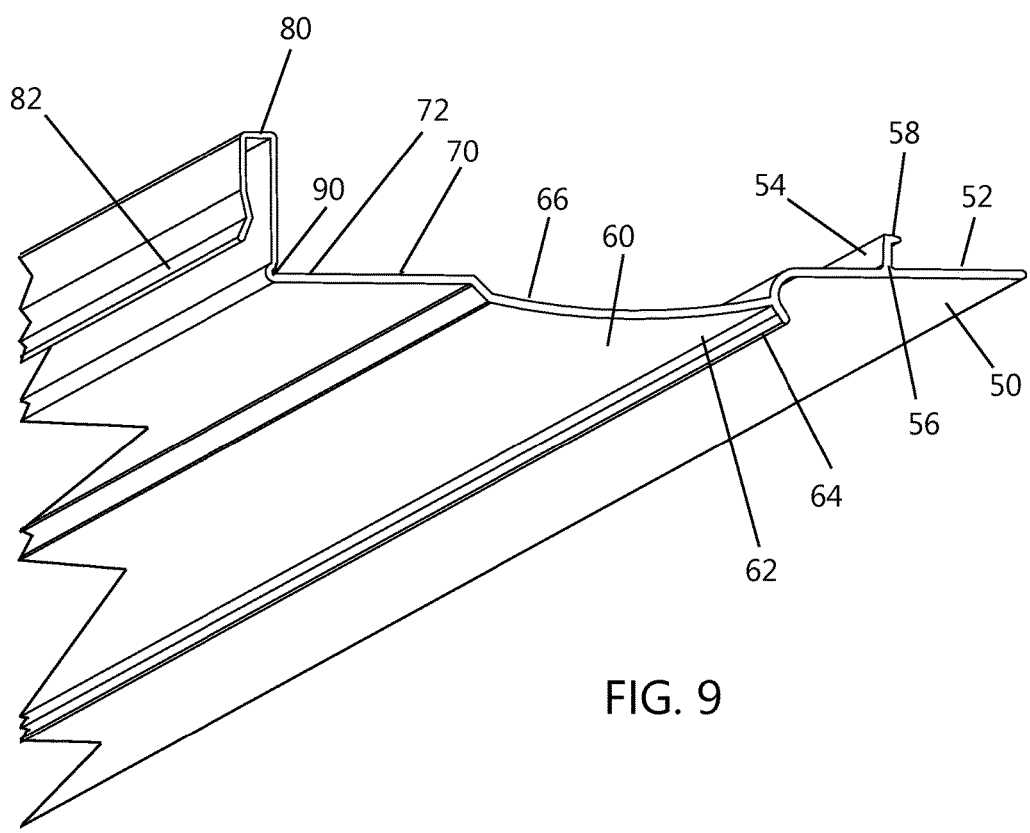
FIG. 9 is a partial perspective bottom back view of a hinged cover in accordance with an embodiment of the invention shown in an open position.
Figure 10:
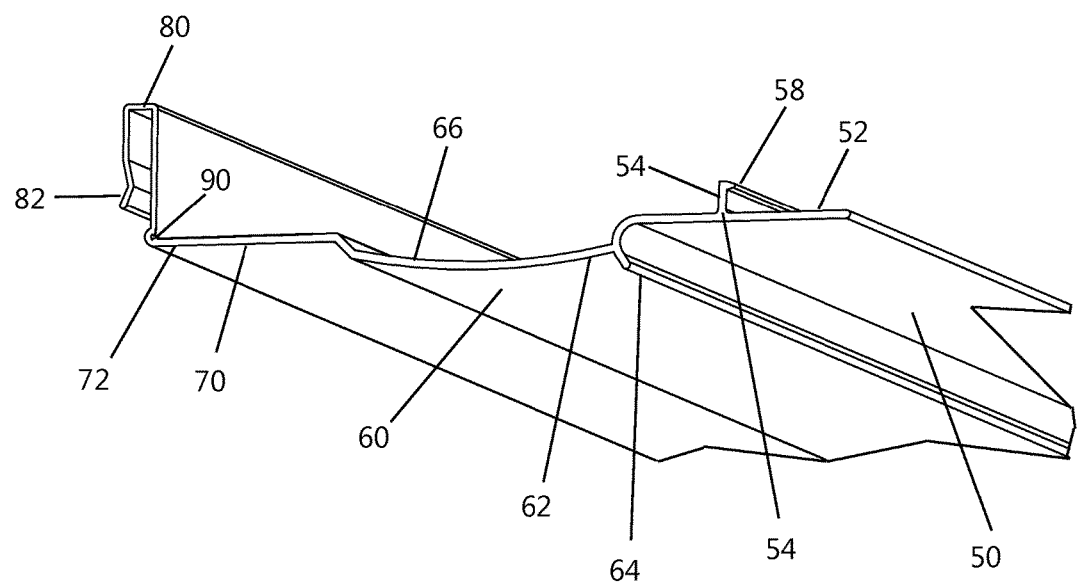
FIG. 10 is a partial perspective bottom front view of a hinged cover in accordance with an embodiment of the invention shown in an open position.
Figure 11:
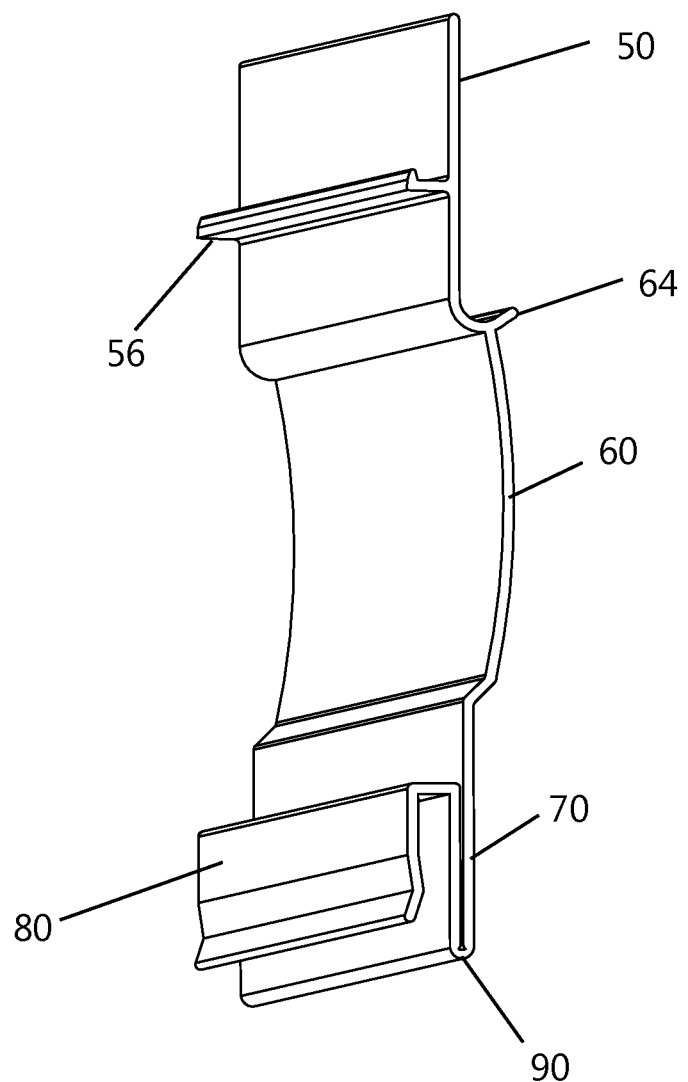
FIG. 11 is a partial perspective bottom back view of a hinged cover in accordance with an embodiment of the invention shown in a closed position.
Figure 12:
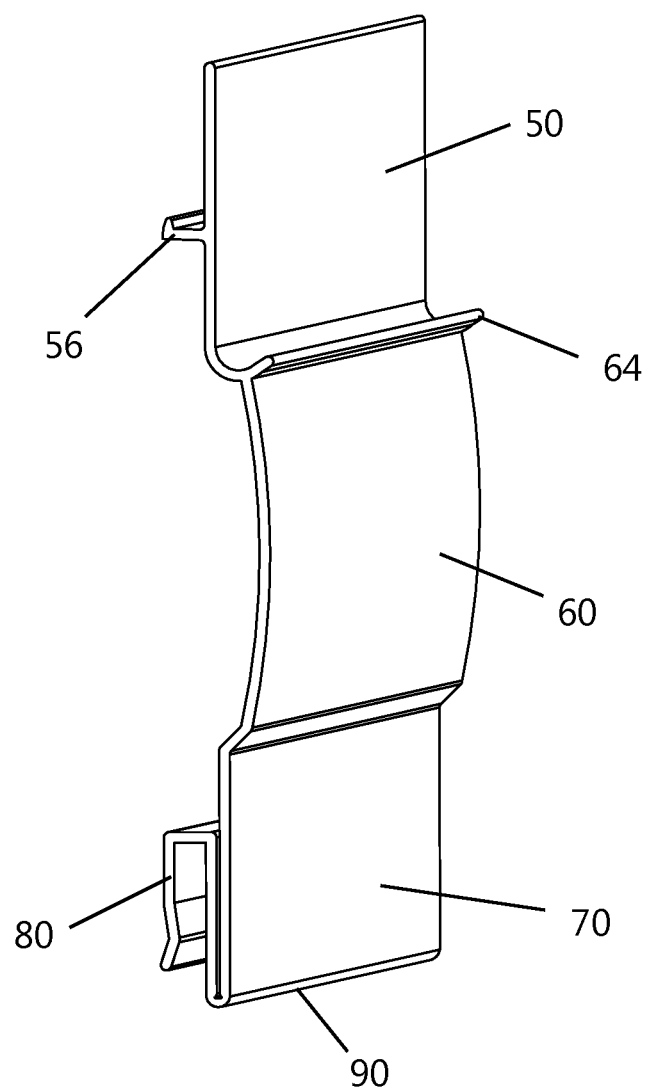
FIG. 12 is a partial perspective bottom front view of a hinged cover in accordance with an embodiment of the invention shown in a closed position.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Generally, the rail cover assembly of the present invention is constructed as a one piece extruded component that has four key design features. The bottom portion of the cover is designed to attach to the bottom portion of the c-channel rail. Just above this attachment feature is a living hinge. The living hinge allows the top part of the cover to swing down and allow access to the rail. The top portion of the cover has a locking mechanism that grabs onto and engages the top portion of the c-channel and retains the cover in a closed position against the c-channel rail. On the outside of the cover is a grip that provides a handle to assist the user when releasing the locking mechanism from the c-channel rail.

The conveyor rail cover 10 of the present invention generally includes an elongated main body 40 having a top section 50, mid section 60 and bottom section 70. Clip 80 extends from the bottom section 70 of the main body and is interconnected to the bottom section 70 by a living hinge 90. The top section 50 has a locking tab 56 extending from an inner side 52 of the top section 50. The mid section 60 has a handle member 64 extending from an outer side 62 of the mid section 60. The bottom section 70 has a clip 80 extending from a bottom 72 of the bottom section 70, wherein the living hinge 90 interconnects the clip 80 and bottom section 70. The locking tab 56 is flexible and includes a hook 58 extending from an end 54 of the tab 56. The mid section 60 includes an arc 66 that extends outward away from plane of the top section 50 and bottom section 70. The arc 66 creates flexibility in the mid section 60.

Referring now to FIGS. 1-5, FIG. 1 illustrates a construction of a conveyor system 02. The conveyor system 02 includes rollers 08 rotatably coupled to side rails 04 and 06. Each side rail is of the c-channel 14 type and includes a closed back 16, closed top 18, closed bottom 20, and flanges 22 and 24. The flanges 22 and 24 extend from top 18 and bottom 20 towards each other and the middle to form a partially enclosed front section. Wires and components (not pictured) are attached within the c-channel rail 14. Rail cover 10 encloses the partially open front and restricts access to the wires and components within the c-channel. Clip 80 engages the bottom flange 24 and the locking tab 56 engages the top flange 22.

FIGS. 6-10 illustrates the cover 10 rotated about living hinge 90 to an open position. Clip 80 includes a flared open end 82 that guides the clip onto the flange. The clip is sized slightly smaller than the flange so that when the clip is press fit onto the flange, the sides of the clip engage the flange and provide a resistance that keeps the clip engaged to the flange when the cover is rotated about the living hinge 90. The living hinge 90 is made of a known suitable construction and may be contiguous with the clip 80 and bottom section 70 or may be manufactured separately and the interconnected to the clip 80 and bottom section 70.

Figure 13:
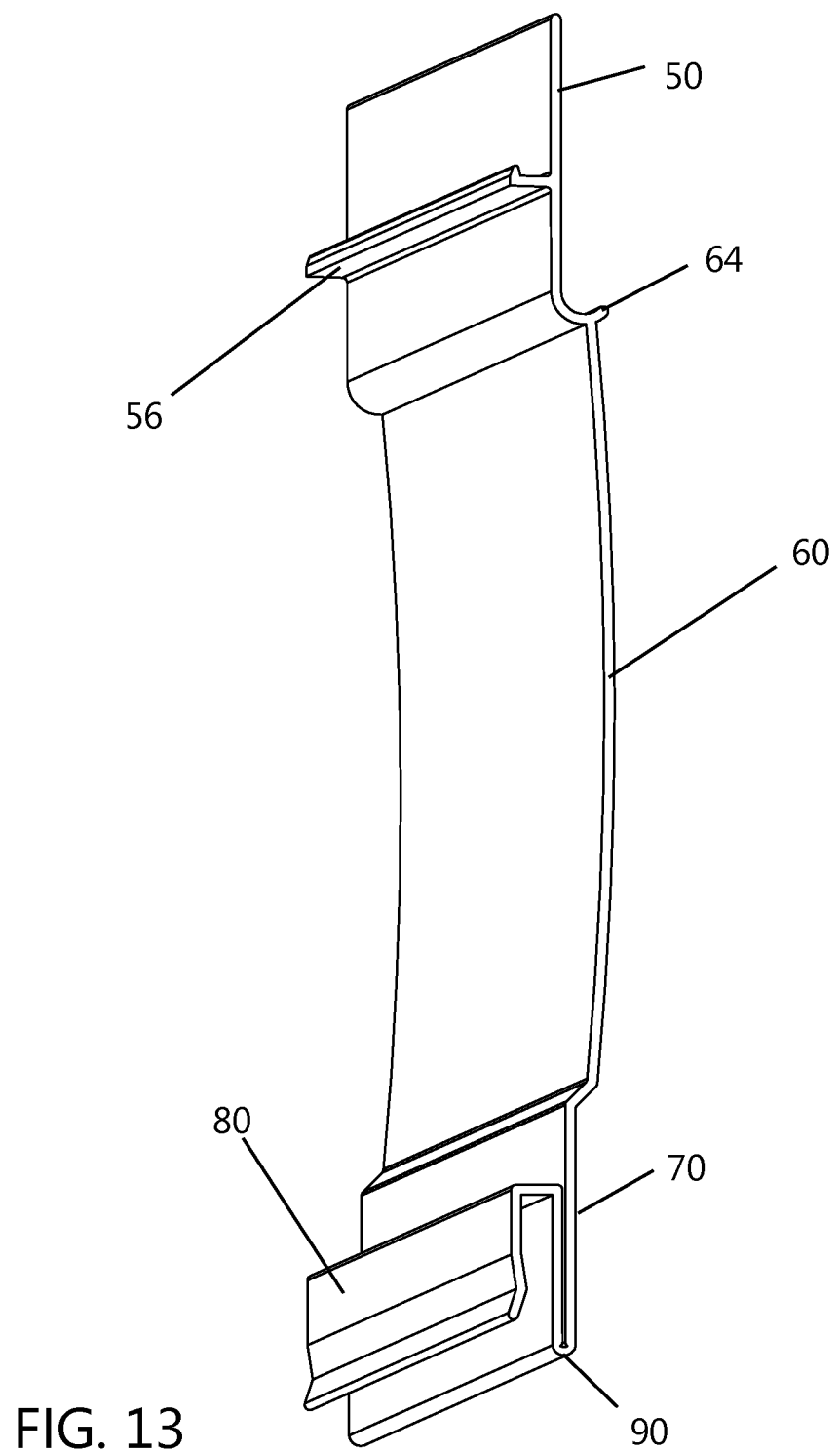
FIG. 13 is a partial perspective bottom back view of a hinged cover in accordance with an embodiment of the invention shown in a closed position.
Figure 14:
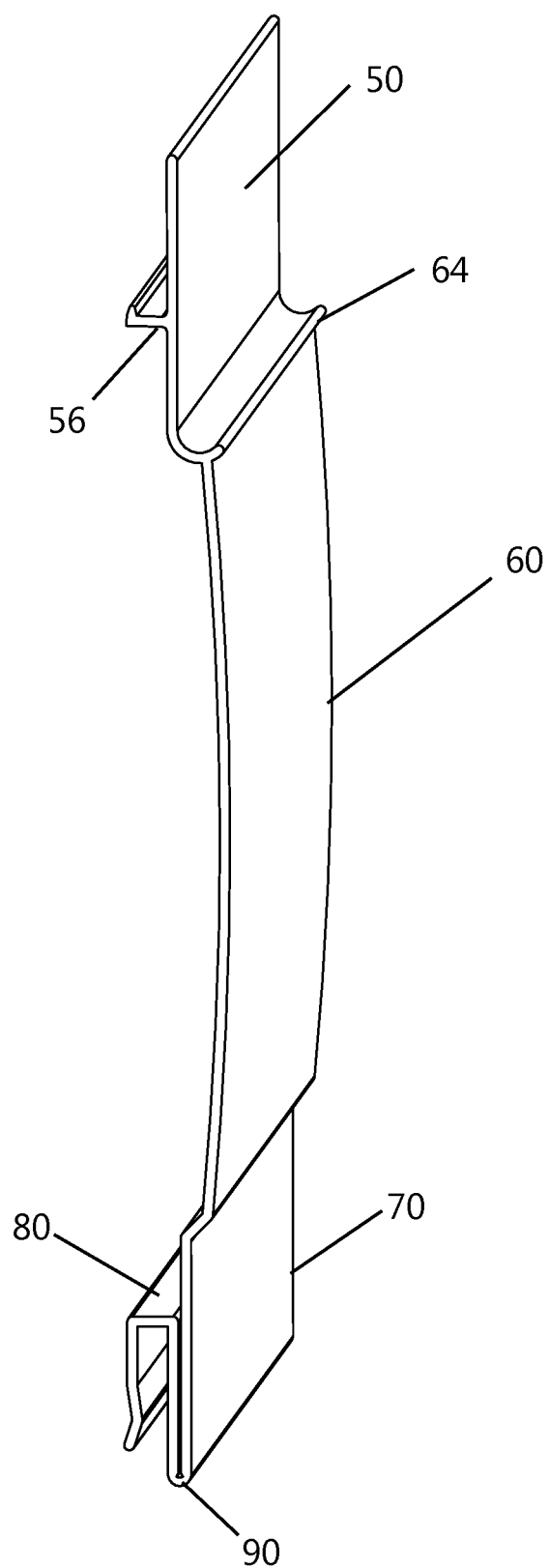
FIG. 14 is a partial perspective bottom front view of a hinged cover in accordance with an embodiment of the invention shown in a closed position.

FIGS. 11-14 illustrates cover 10 a reduced width in the mid section 60 (FIGS. 11 and 12) or an elongated mid section 50 (FIGS. 13 and 14). The reduced width mid section is, for example, particularly well suited for a c-channel rail having a width of 5.5 inches while the elongated mid section is particularly well suited for a c-channel rail having a width of 7.5 inches. Those skilled in the art will recognize that the width of the mid section may be varied dependent upon the width of the open section between the top and bottom flange 22 and 24 of the c-channel. Further, the thickness of the cover may be varied to provide more or less resistance to bending in the arc 66 section.

Those skilled in the art will appreciate that the channel cover 10 of the present invention may be constructed as a one piece extruded plastic component or may be made from two different types of plastic. By way of example, the living hinge 90 may be made congruent with the one piece component or may be made from a different plastic than the clip 80 and elongated main body 40. The cover 10 may be made of a material such as polypropylene to provide a built-in spring loaded tension that pushes the locking mechanism into the upper part of rail 14. When a downward force is applied to the grip 64, the tab 56 and hook 54 release from the rail 14 and allows the cover 10 to pivot down. Once down the cover 10 can hang and not be detached from the rail 14. The cover 10 may be pivoted to a closed position around the living hinge 90. A downward force is applied to the grip 64 allowing the tab 56 and hook 54 or locking mechanism to clear the top flange 22 of the c-channel rail 14. Once in place the downward pressure is removed and the locking tab 56 grabs onto the rail 14 securing the cover 10 in place.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An apparatus for covering a c-channel side rail of a conveyor framework, the apparatus comprising:
    an elongated main body having a top section, mid section and bottom section;
    the top section having a locking tab extending from an inner side of the top section;
    the mid section having a handle member extending from an outer side of the mid section; and
    the bottom section having a clip extending from a bottom of the bottom section, wherein a living hinge interconnects the clip and bottom section.

2. The apparatus as recited in claim 1, wherein the locking tab is flexible and includes a hook extending from an end of the tab.

3. The apparatus as recited in claim 2, wherein the mid section arcs to create flexibility in the mid section.

4. The apparatus as recited in claim 2, wherein the elongated main body adapts to enclose an open section of a longitudinal c-channel conduit, wherein the c-channel conduit has an enclosed side, an enclosed top, an enclosed bottom and flanges extending from the top and bottom towards each other to form a partially open side and the clip engages the bottom flange and the locking tab engages the top flange.

5. An apparatus for covering a c-channel side rail of a conveyor framework, the apparatus comprising:
    an elongated main body having a top section, mid section and bottom section;
    the top section having a locking tab extending from an inner side of the top section;
    the mid section having a handle member extending from an outer side of the mid section;
    the bottom section having a clip extending from a bottom of the bottom section, wherein a living hinge interconnects the clip and bottom section; and
    wherein the elongated main body adapts to enclose an open section of a longitudinal c-channel conduit, wherein the c-channel conduit has an enclosed side, an enclosed top, an enclosed bottom and flanges extending from the top and bottom towards each other to form a partially open side and the clip engages the bottom flange and the locking tab engages the top flange.

6. The apparatus as recited in claim 5, wherein the locking tab is flexible and includes a hook extending from an end of the tab.

7. The apparatus as recited in claim 6, wherein the mid section arcs to create flexibility in the mid section.

8. An apparatus for covering a c-channel side rail of a conveyor framework, the apparatus comprising:
    an elongated main body having a top section, mid section and bottom section;
    the top section having a flexible locking tab extending from an inner side of the top section;
    the mid section having an arc to create flexibility in the mid section and the mid section further having a handle member extending from an outer side of the mid section;
    the bottom section having a clip extending from a bottom of the bottom section, wherein a living hinge interconnects the clip and bottom section; and
    wherein the elongated main body adapts to enclose an open section of a longitudinal c-channel conduit, wherein the c-channel conduit has an enclosed side, an enclosed top, an enclosed bottom and flanges extending from the top and bottom towards each other to form a partially open side and the clip engages the bottom flange and the locking tab engages the top flange.

* * * * *